(12) United States Patent
Sakraschinsky et al.

(10) Patent No.: US 10,080,982 B2
(45) Date of Patent: Sep. 25, 2018

(54) ARRANGEMENT FOR FORMING A SEAL

(71) Applicant: Hydac Filtertechnik GmbH,
Sulzbach/Saar (DE)

(72) Inventors: Michael Sakraschinsky, St. Ingbert (DE); Volkmar Klein, Zweibrücken (DE); Armin Schmidt, Illingen (DE)

(73) Assignee: HYDAC FILTERTECHNIK GMBH, Sulzbach/Saar (DE)

( * ) Notice: Subject to any disclaimer, the term of this patent is extended or adjusted under 35 U.S.C. 154(b) by 499 days.

(21) Appl. No.: 13/261,946

(22) PCT Filed: Mar. 26, 2013

(86) PCT No.: PCT/EP2013/000909
§ 371 (c)(1),
(2) Date: Aug. 28, 2014

(87) PCT Pub. No.: WO2013/143689
PCT Pub. Date: Oct. 3, 2013

(65) Prior Publication Data
US 2014/0373325 A1    Dec. 25, 2014

(30) Foreign Application Priority Data

Mar. 27, 2012 (DE) .................. 10 2012 006 226

(51) Int. Cl.
*B01D 29/00* (2006.01)
*B01D 35/06* (2006.01)
(Continued)

(52) U.S. Cl.
CPC ......... *B01D 29/0093* (2013.01); *B01D 27/08* (2013.01); *B01D 29/114* (2013.01);
(Continued)

(58) Field of Classification Search
CPC .... B01D 29/0093; B01D 29/15; F16J 15/164; F16J 15/406; F16J 15/3236; F16J 15/064; B25B 11/005; B25B 5/00
See application file for complete search history.

(56) References Cited

U.S. PATENT DOCUMENTS 4,168,237 A * 9/1979 Pickett .................. B01D 27/08
                                                        210/440
5,906,740 A * 5/1999 Brown .................. B01D 27/08
                                                        210/440
(Continued)

FOREIGN PATENT DOCUMENTS

DE        41 24 323 A1    1/1993
DE   10 2006 036 231 A1    2/2008
(Continued)

*Primary Examiner* — Christopher M Koehler
*Assistant Examiner* — Seahee Yoon
(74) *Attorney, Agent, or Firm* — Wenderoth, Lind & Ponack, L.L.P.

(57) ABSTRACT

An assembly forms a seal between components (11, 33) having sealing zones (37,51). The sealing zones face each other in a functional position of the components. A sealing element (43, 57) is on the sealing zone (37, 51) of one component (11, 33). A sealing surface (51) is on the sealing zone (37, 51) of the other component (11, 33) to form a radial seal. The components (11, 33) can be brought into the functional position by a relative movement in the axial direction. The sealing element (43, 57) sealingly interacts with the sealing surface (51) in the functional position. A third component (61) associated with an actuating part (62) acts on the sealing element (43;57) in the functional position of the components (11, 33) to deform the element to increase the sealing force.

11 Claims, 5 Drawing Sheets

(51) Int. Cl.
  *B01D 35/147* (2006.01)
  *B01D 29/11* (2006.01)
  *B01D 27/08* (2006.01)
  *B01D 29/15* (2006.01)
  *F16J 15/3236* (2016.01)

(52) U.S. Cl.
  CPC ............ *B01D 29/15* (2013.01); *B01D 35/06* (2013.01); *B01D 35/147* (2013.01); *F16J 15/3236* (2013.01); *B01D 2201/295* (2013.01); *B01D 2201/34* (2013.01); *Y10T 29/53657* (2015.01)

(56) References Cited

U.S. PATENT DOCUMENTS

| | | | | |
|---|---|---|---|---|
| 7,396,377 | B2 * | 7/2008 | Lampert | B01D 46/10 123/198 E |
| 8,147,576 | B2 * | 4/2012 | Gillenberg | B01D 46/0046 210/248 |
| 8,580,006 | B2 * | 11/2013 | LaCroix | B01D 46/0005 55/378 |
| 8,613,786 | B2 * | 12/2013 | Krull | B01D 27/08 210/440 |
| 2011/0017657 | A1 * | 1/2011 | Jokschas | B01D 29/15 210/437 |
| 2012/0080437 | A1 * | 4/2012 | Guenther | A61M 1/14 220/501 |

FOREIGN PATENT DOCUMENTS

| | | |
|---|---|---|
| DE | 20 2006 018 335 U1 | 5/2008 |
| FR | 1 186 929 | 9/1959 |
| GB | 2 054 768 A | 2/1981 |

\* cited by examiner

ARRANGEMENT FOR FORMING A SEAL

FIELD OF THE INVENTION

The present invention relates to an assembly for forming a seal between components including sealing zones that face one another when the components are in a functional position. A sealing element is provided on the sealing zone of the one component, and a sealing surface is provided on the sealing zone of the other component to form a radial seal. The components may be brought into the functional position by a relative movement carried out in the axial direction, in which functional position the sealing element interacts in a sealing manner with the sealing surface in a sealing manner.

BACKGROUND OF THE INVENTION

To ensure a secure and pressure-resistant seal in radial sealing systems, a sufficiently high pressure force between sealing element and sealing surface is essential. Achieving the necessary surface pressure requires considerable deformation of the sealing element, which, in the case of sealing materials used particularly often, can range from 8% to 20%. The increase in sealing force achieved in this way results in the formation of a correspondingly strong frictional locking at the sealing points between the components sealed against each other. The corresponding assembly and disassembly operations are hampered considerably. When sealing points are involved, the sealing points must be loosened more frequently, as is the case, for example, with sealing points on replacement parts, such as spare parts or the like, or if it involves maintenance points at which the seal must be loosened more frequently. In the case of correspondingly high sealing forces, carrying out assembly operations without the help of tools or devices is nearly impossible.

SUMMARY OF THE INVENTION

An object of the invention is to provide an improved assembly that provides simple and convenient loosening of the sealing points formed, in spite of high, active sealing forces.

According to the invention, this object is basically achieved by an assembly, which includes a third component associated with an actuating part, acting on the sealing element in the functional position of the components to deform the element to increase the sealing force. According to the invention, the deformation that increases the sealing force, because it occurs as a result of the action of the actuating part when the components are in the functional position, allows the non-deformed sealing element to be dimensioned such that the relative movements of the components carried out for assembly and disassembly are easily and effortlessly accomplished. In the case of a non-deformed sealing element, no high frictional forces are present to overcome. On the other hand, a corresponding deformation may be achieved by the action of the actuating part, which actuating part produces the compression required to secure the seal.

In a preferred embodiment of the assembly according to the invention, the axial relative movement takes place in a longitudinal direction between the third component and the two other components. Two sealing parts of the sealing element execute, at least partially, a radial transverse movement or closing movement transverse to the longitudinal direction, thereby forming the radial seal. The sealing effect of the radial seal is increased with increasing axial relative movement, as the third component enters between the two sealing parts. The longitudinal direction then conforms to the central longitudinal axis of the entire assembly.

The sealing element, when designed preferably in the form of an elastomeric, and thus flexible, sealing ring, has a V-shape, as viewed preferably in cross-section. The two sealing parts then form arms of the V-shaped sealing ring to be spread apart. Instead of a V-shape, a U-shaped ring can be selected, which ring then has sealing parts in the form of arm portions that extend preferably outward in a visibly conical manner.

In preferred exemplary embodiments, the sealing zone of the one component is provided on an element holder of a filter housing, and the sealing zone of the other component is provided on a filter element that may be inserted in and removed from the filter housing. In an application of this type, which results in large sealing diameters between element holder and filter element, the ease of the assembly operations achieved according to the invention has a particularly advantageous effect, particularly since the required filter element replacement makes it necessary to frequently separate the relevant sealing points.

The assembly may be devised in a particularly advantageous manner where the sealing surface on the relevant component is extended in the axial direction such that multiple relative axial positions of the components are permissible as functional positions forming the seal. The reliability of the seal, because it is not dependent on retaining the components in precise axial positions, eliminates the need to provide a correspondingly narrow tolerance for the installation positions of the components. This arrangement has a particularly advantageous effect, inter alia, in the case of seals between a filter element and a filter housing, because a particularly simple and cost-efficient design may be implemented, given the fact that maintaining particularly narrow tolerances for either the dimensions of the filter element or the housing components that position the filter element on the element holder is unnecessary.

In such an application, the sealing surface is preferably provided on the element holder of the filter housing, with the sealing element being on the end cap of the relatable filter housing.

In this case, the assembly may be particularly advantageously designed so that the third component includes a movable hold-down. To hold the filter element in the corresponding installation position corresponding to the functional position of the seal, the hold-down may be moved into an active position adjacent to the end cap, in which the actuating part acts on the sealing element.

In particularly preferred exemplary embodiments, the sealing element may have at least partially a V-shaped cross-section with one arm abutting the outer periphery of the end cap of the filter element and one arm interacting with the sealing surface of the element retainer. An actuating part in the form of a ring projecting on the hold-down is provided. The ring compresses the sealing element at the hold-down adjacent to the end cap by spreading the arms between end cap and sealing surface. A design of this type is advantageous in several respects. On the one hand, the result is a simply designed system having a filter housing and a filter element. The hold-down functions both as a holding element of the filter element and as an actuating element for the sealing assembly. The actuating part of the hold-down, by entering between the arms of the sealing element, causes the spreading deformation of the sealing element to increase in the sealing force. On the other hand, the actuation, i.e., the activation of the sealing assembly occurs, for all practical purposes, automatically in the course of the fixing of the filter element on the element holder, as a result of the movement of the hold-down toward the end cap.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure.

DETAILED DESCRIPTION OF THE INVENTION

Figure 1:
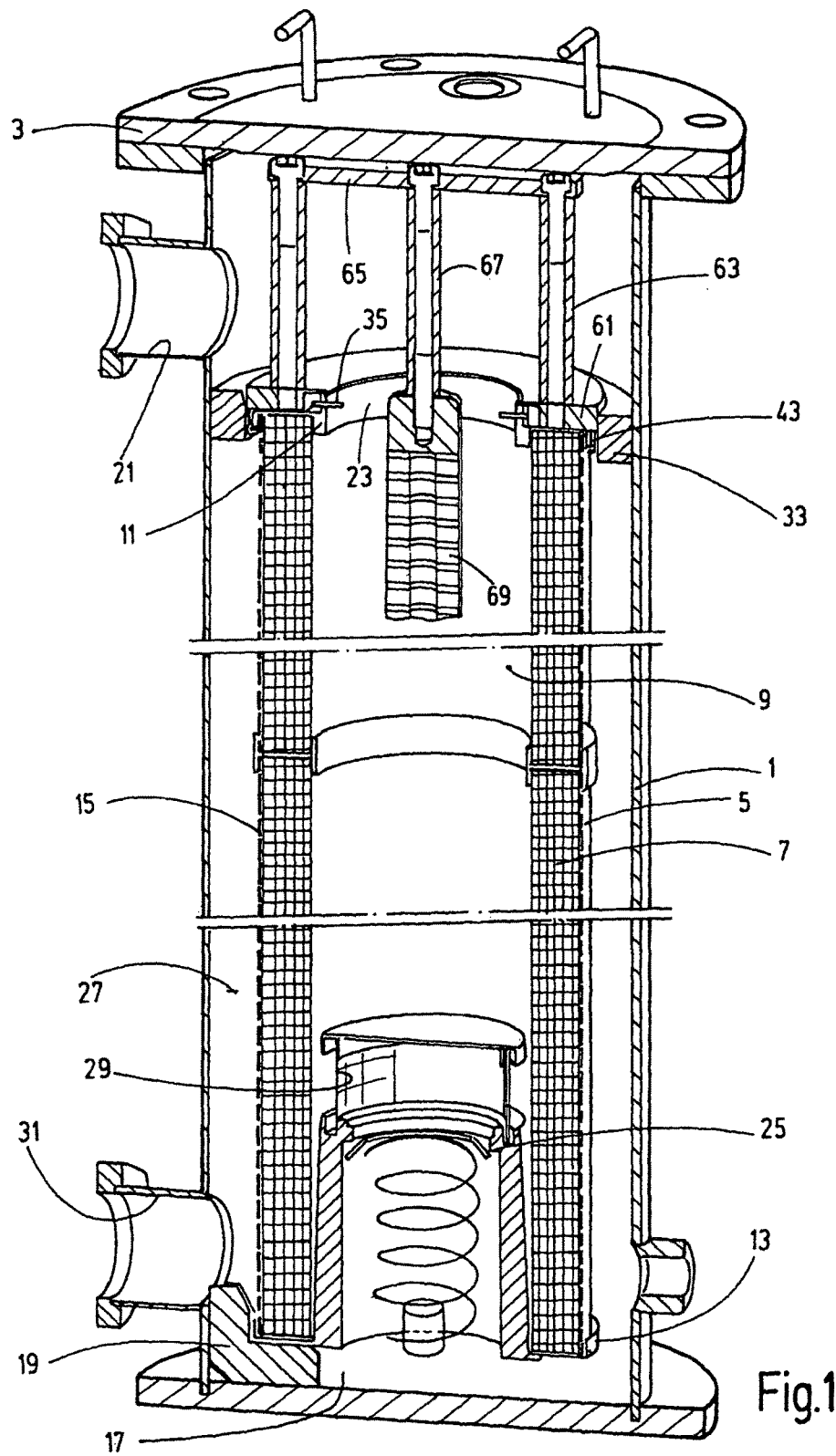
FIG. 1 is a perspective view in section with breaks of a filter device with an assembly forming a seal according to a first exemplary embodiment of the invention.

The invention is explained below with reference to exemplary embodiments. The assembly according to the invention is provided in a filter device for forming a seal between an element holder of a filter housing and an end cap of a filter element. The filter element may be inserted in and removed from the filter housing. FIG. 1 shows a partially schematic, simplified representation of a corresponding filter device having a hollow cylindrically-shaped filter housing 1. Housing 1 is closed at the bottom and may be sealed at the top thereof with a removable housing cover 3. The filter element 5 may be housed in the filter housing 1 and includes a filter medium 7, as is usual in such elements, surrounding an interior filter chamber 9 in the form of a hollow cylinder. The axial ends of filter medium 7 are enclosed by an upper end cap 11 and a lower end cap 13. The filter element 5 is provided for a perfusion from the interior filter chamber 9 outwardly during the filtration process. Thus, the filter medium 7 is surrounded by an outer support tube 15, which extends from end cap 11 to end cap 13. In the assembled functional position of the filter element 5 depicted in FIG. 1, the bottom end cap 13 is separated from the housing bottom 17 by multiple, preferably three, foot elements 19. Only one of the foot elements 19 is visible in the rotational position shown in FIG. 1.

The filter housing 1 includes an intake 21 for supplying the fluid to be filtered. The unfiltered fluid enters above the upper end cap 11 of the filter element 5. The upper end cap 11 includes a central opening 23 that leads into the interior filter chamber 9. The raw or dirty side of intake 21 continues as far as the interior filter chamber 9. Forming the bottom closure of the filter chamber 9, and with that, the raw side or dirty side during the filtering process, is a bypass valve 25.

In the event of a corresponding differential pressure, bypass valve 25 enables the fluid to pass from the filter chamber 9 through the end cap 13 down to the housing bottom 17. Since bypass valves of this type are prior art, the bypass valve 25 in FIG. 1 is indicated merely schematically. A sieve 29 is situated upstream of the bypass valve 25 so that, in response to the bypass valve 25, no dirt passes unimpeded to the housing bottom 7 and, therefore, to the clean side 27 surrounding the filter element 5. An outlet 31 is provided on the housing 1 for discharging fluid from the clean side 27.

Figure 2:
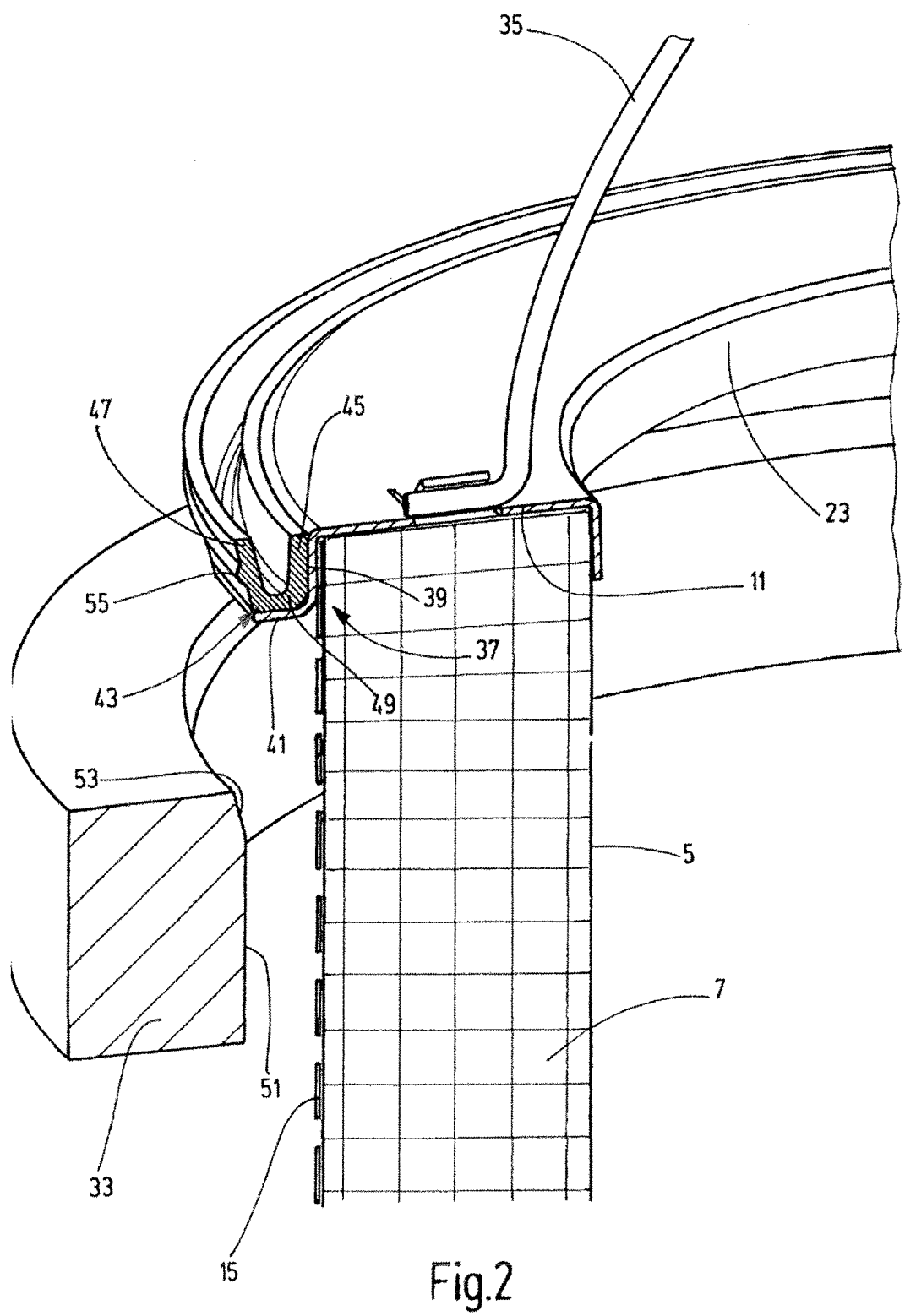
FIG. 2 is a partial greatly enlarged perspective view, in which only a partial section of the element holder of the filter housing and of an interacting part of a filter element with a sealing element situated on the end cap thereof of FIG. 1 is illustrated.

To fix the filter element 5 in the functional position, the filter housing 1 includes an element holder 33 in the form of an annular body. Element holder 33 interacts with the circumferential region of the upper end cap 11 of the filter element 5 to form the sealing assembly according to the invention. By the sealing assembly the raw side or dirty side is sealed off from the clean side 27 located on the outside of the filter element 5. Further details of a first exemplary embodiment of this assembly according to the invention are shown in FIG. 2. As is apparent from FIG. 2, the end cap 11, on its upper side, has a pivotable retaining bracket 35 attached. End cap 11 includes a step 37 on its outer circumference, which forms an interior cylindrical surface 39 bordered by a radial projection 41, forming a sealing zone 37. As a result, a seat is formed for a sealing element in the form of a V-shaped molded seal 43. In the present example, this molded seal 43 is formed from an elastomer material, for example, a synthetic rubber. The interior arm 45 of the molded seal 43 abuts the cylindrical surface 39, and is secured to the surface by the inherent tensioning of the molded seal 43 and/or by adhesion. The other V-arm 47 of seal 43 is connected to the inner arm 45 by a profile web 49 and is provided for interacting with a sealing surface 51 of the element holder 33. The circular cylindrical surface 51 includes an insertion chamfer 53 at its insertion end situated above in FIG. 2. The outer V-arm 47 of the molded seal 43 provided for sealing at the sealing surface 51 includes a radially projecting sealing bead 55. The sealing bead 55 may also be omitted in certain applications, without impairing the sealing effect.

Figure 3:
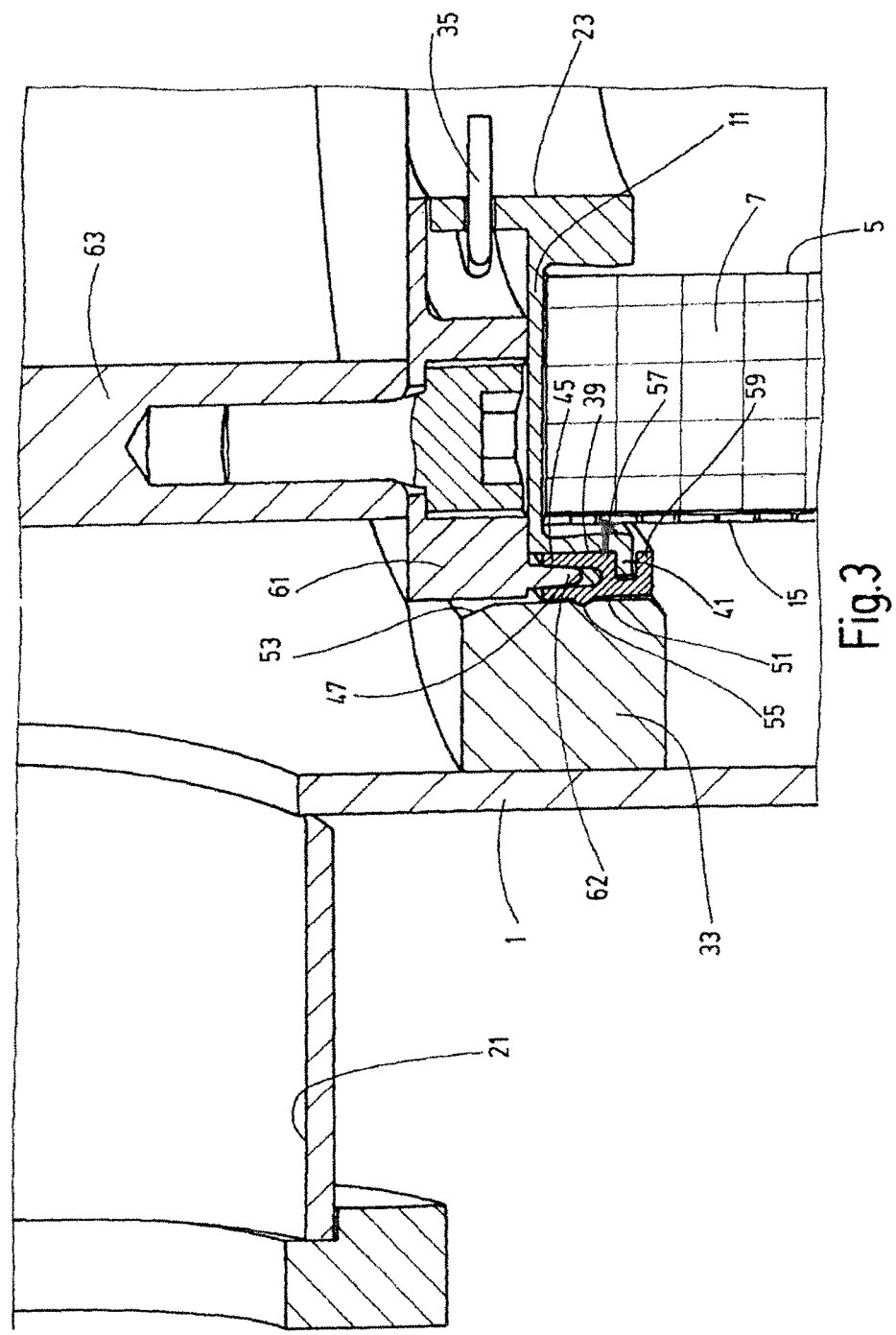
FIG. 3 is an enlarged, partial side view in section of an assembly according to a second exemplary embodiment of the invention, with only the parts of an associated filter device interacting with the sealing assembly being shown.
Figure 4:
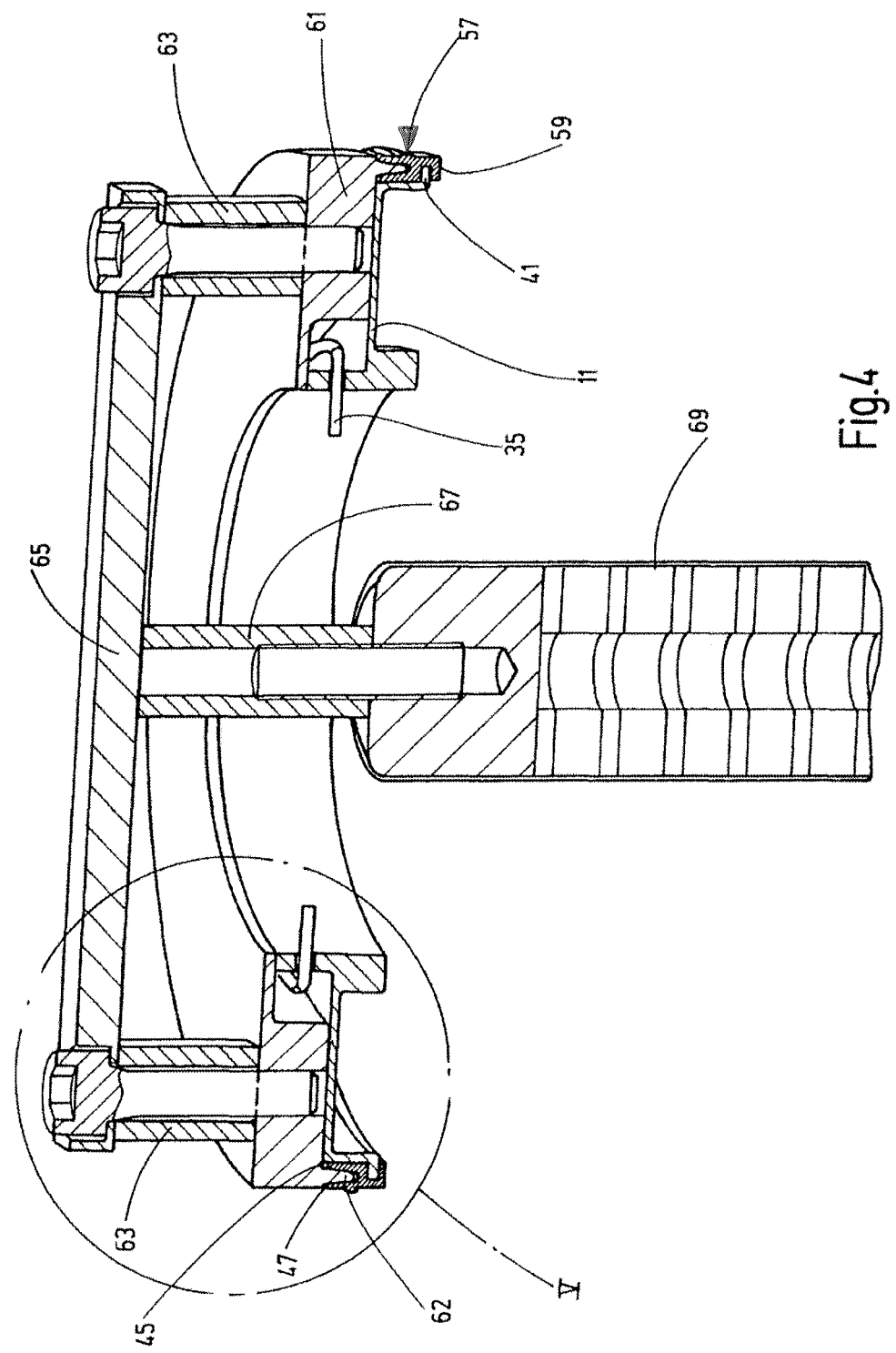
FIG. 4 is a partial side view in section of the end cap of the filter element provided with the sealing element of FIG. 3 with a hold-down interacting with the end cap.
Figure 5:
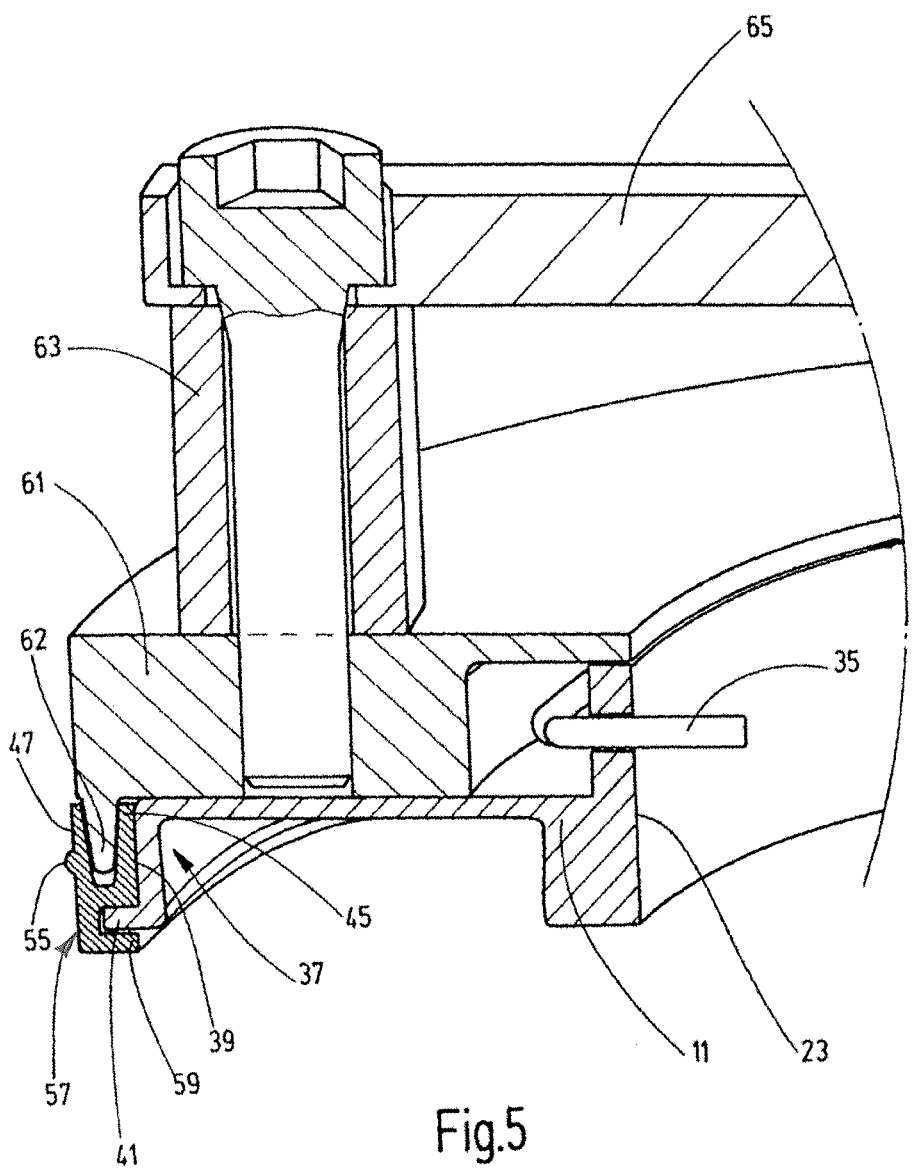
FIG. 5 is an enlarged side view in section of the area by V in FIG. 4.

FIGS. 3 through 5 show a second exemplary embodiment of the assembly according to the invention, which differs from the first example solely by a modified shape of the sealing element. The region situated above the web 49 and forming the arms 45 and 47 of the modified molded seal 57, corresponds to the molded seal 43 of FIG. 2. A projection 59 is joined to the underside of the web 49 that connects the arms 45, 47. Together with the web 49, arms 45, 47 form a U-profile or V-profile. The projection 59 engages with the radial projection 41 of the end cap 11 that forms the edge of the cylindrical surface 39. This engagement of projection 59 and projection 41 forms a positive locking of the molded seal 57 against axial displacement, so that seal 57 is securely fixed in the event of axial loads, which occur during assembly operations.

FIGS. 1 and 3 show the installation scenario of the completed sealing assembly according to the first and second exemplary embodiments. Provided for the actual actuation of the assembly in both exemplary embodiments is a third component, including an actuating part that in the functional position, acts to deform the molded seal 43 or 57 such that the seals are compressed between cylindrical surface 39 of the end cap 11 and the sealing surface 51 on the element holder 33 as a result of a wedge-like engagement in the intermediate space of the V-arms 45, 47. During installation operations, the outer arm 47 reaches the sealing surface 51 via the insertion chamfer 53 merely under the influence of its inherent tension. The arm 47, after the spreading deformation of the molded seal 43, 57, abuts the sealing surface 51 with the high sealing force required for an absolutely secure seal.

In both exemplary embodiments shown herein, the third component includes the actuating part that deforms the molded seal 43, 57 and as can be seen in FIGS. 1 and 3, is formed by an annular body 61. Annular body 61 may be located at the upper side of the element cap 11, and functions as a hold-down to axially secure the filter element 5 to the element holder 33 in the installation position corresponding to the functional position of the sealing assembly. An axially projecting, conically tapering ring 62 is provided as the actual actuating part on the circumferential area of the annular body 61. In the functional position, see in particular FIG. 3, annular body 61 acts as an expansion element between the arms 44, 47 to increase the sealing force with which the arm 47 with its sealing bead 55 abuts the sealing surface 51. As is also most clearly seen in FIG. 3, the axial length of the sealing surface 51 is dimensioned so that multiple, relative axial positions of the molded seal 43, 57 are permissible for a secure seal. This arrangement eliminates the need to provide components, which maintain narrow tolerance limits, to position the annular body 61 provided as a hold-down for the filter element 5.

Such components associated with the annular body 61 in the examples shown are each provided in the form of axially oriented supports 63. Supports 63 are screwed on their undersides to the annular body 61 and at the upper end to a magnetic holder 65. The annular body 61 is supported on the housing cover 3 by the supports 63, see FIG. 1. Attached in the central area of the magnetic holder 65 is a connecting part 67 for a magnetic core 69, which core extends via the opening 23 of the end cap 11 into the filter chamber 9 of the filter element 5. Such magnetic cores 69, provided with a permanent magnetic device, are prior art.

In the examples described herein, in which the opening of the V-profile of the molded seals 43, 57 during the filtration operation faces the raw side. The side with the higher pressure then acts on the sealing point. A pressure activation of the sealing assembly results during operation, in addition to the increase in sealing force caused by the deformation of the sealing element (molded seal 43, 57).

While various embodiments have been chosen to illustrate the invention, it will be understood by those skilled in the art that various changes and modifications can be made therein without departing from the scope of the invention as defined in the claims.

The invention claimed is:

1. An assembly forming a seal, comprising:
   first and second components being relatively movable axially relative to one another along a longitudinal axis thereof and facing one another in an axial functional position of said first and second components;
   a first sealing zone on said first component;
   a sealing surface on a second sealing zone of said second component;
   a radial seal on said first sealing zone and sealingly engaging and interacting with said sealing surface in a functional position of said radial seal; and
   a third component being coupled to an actuating part being movable relative to said radial seal along said longitudinal axis and engaging said radial seal in an axial direction along said longitudinal axis deforming said radial seal radially of said longitudinal axis and increasing a sealing force thereof.

2. The assembly according to claim 1 wherein said radial seal comprises first and second sealing parts being movable transverse to said longitudinal axis and increasing the sealing force as a functional of said third component being inserted further axially between said first and second sealing parts as said first and second components are moved axially toward one another.

3. The assembly according to claim 1 wherein one of said first and second components comprises an element holder of a filter housing with said sealing zone thereof being on said element holder; and another of said first and second components is on a filter element insertable into and removable from said filter housing.

4. The assembly according to claim 1 wherein said sealing surface extends axially parallel to said longitudinal axis on said second component providing multiple, relative axial functional positions of said first and second components sealing said first and second components to one another.

5. The assembly according to claim 1 wherein said sealing surface is on an element holder of a filter housing; and said radial seal is on an end cap of a filter element insertable into and removable from said filter housing.

6. The assembly according to claim 5 wherein said third component comprises a movable hold-down holding said filter element in an installed position of said filter element in said filter housing corresponding to the functional position of said radial seal, said hold-down being movable to an active position adjacent said end cap in which said actuating part engages and acts on said radial seal.

7. The assembly according to claim 6 wherein at least a part of said radial seal has a V-shaped cross-section with a first arm abutting an outer periphery of said end cap of said filter element and with a second arm interacting with said sealing surface that is on said element holder; and said actuating part comprises a ring projecting on said hold-down and compresses said radial seal by spreading said first and second arms between said end cap and said sealing surface.

8. The assembly according to claim 5 wherein said sealing surface comprises a cylindrical surface having an insertion chamfer at one end of said cylindrical surface, said insertion chamfer expanding said cylindrical surface radially.

9. The assembly according to claim 7 wherein said end cap comprises a cylindrical surface being on said outer periphery of said end cap and engaging said first arm of said radial seal; a web connects said first and second arms; and said cylindrical surface of said end cap merges into a radially projecting edge, said web abutting said radially projecting edge.

10. The assembly according to claim 9 wherein said radial seal comprises a projection connected to said web forming a U-shaped cross-section enclosing said radially projecting edge of said end cap.

11. The assembly according to claim 1 wherein said first, second and third components are relatively movable relative to one another.

* * * * *